350-413 SR 55C

XR 3,626,194

[redacted]

SEARCH ROOM

United States

7 [11] 3,626,194

[72] Inventors Jiro Hirano
Kobe-shi;
Hidetoshi Togo, Itami-shi; Katsuhiko
Nishida, Tokyo-to, all of Japan

[21] Appl. No. 853,118
[22] Filed Aug. 26, 1969
[45] Patented Dec. 7, 1971
[73] Assignee Nippon Selfoc Kabushiki Kaisha also known as Nippon Silfoc Co., Ltd. Tokyo-to, Japan
[32] Priorities Aug. 30, 1968
[33] Japan
[31] 43/62607;
Aug. 30, 1968, Japan, No. 43/62608

[54] PHOTOELECTRIC CONVERTER INCLUDING CONVERGENT LENS WITH REFRACTIVE INDEX DISTRIBUTION
10 Claims, 5 Drawing Figs.

[52] U.S. Cl. .......... 250/216, 210/217 SS, 350/175 GN
[51] Int. Cl. .......... G02b 5/14
[50] Field of Search .......... 250/211, 212, 239, 227, 216, 217 SS; 350/175 GN

[56] References Cited
UNITED STATES PATENTS

| | | | |
|---|---|---|---|
| 3,212,401 | 10/1965 | Navias .......... | 350/175 |
| 3,284,722 | 11/1966 | Gray .......... | 350/175 X |
| 3,368,078 | 2/1968 | Flint et al. .......... | 250/211 X |
| 3,423,594 | 1/1969 | Galopin .......... | 250/211 |
| 3,517,198 | 6/1970 | Philipp .......... | 250/211 |

OTHER REFERENCES

Miller: Bell System Technical Journal, Vol. 44; Nov., 1965, pp. 2017-2064, (TK 1 B435)

Fowler et al.: Applied Optics, Vol. 5, No. 10, pp. 1675-1681, Oct. 1966 (QC 350.A5)

Kawakami et al.: IEEE Transactions On Microwave Theory and Techniques, Vol. MTT-16, No. 10, Oct. 1968, pp. 814-818

Pearson et al.: Applied Physics Letters, Vol. 15, No. 2, July 15, 1969, pp. 76, 77

*Primary Examiner*—Walter Stolwein
*Attorneys*—Robert E. Burns and Emmanuel J. Lobato

ABSTRACT: Disclosed herein is a photoelectric converter including a convergent lens with a transparent member having a refractive index distribution, in a cross section perpendicular to a travelling axis of light, so as to substantially satisfy the equation:

$n_r = n_o(1 - ar^2)$ when a refractive index at the center of the cross section is $n_o$, a refractive index at a distance $r$ from the center is $n_r$ and a positive constant is $a$.

3626194
OR IN 250/552

PATENTED DEC 7 1971 3,626,194

PHOTOELECTRIC CONVERTER INCLUDING CONVERGENT LENS WITH REFRACTIVE INDEX DISTRIBUTION

BACKGROUND OF THE INVENTION

Generally, in a semiconductor light detector such as, for instance, a PN junction phototransistor, the PN junction is inversely biased. That is, impressed with a DC voltage which is the positive on the N side and negative on the P side, and several $\mu$A of dark current flows in the junction in case light is not radiated thereto. When light is radiated extremely close to the PN junction, minority carriers are internally discharged, thereafter immediately dispersing and constituting a photocurrent after passing through the junction. Minority carriers generated considerably away from the junction are recombined before they reach the junction, so that they do not contribute to the constitution of the photocurrent. The quantum efficiency, and therefore photoelectric sensitivity, of the PN junction phototransistor is such that approximately one electron-hole pair is generated per light quantum absorbed in the neighborhood of the junction.

Accordingly, in order to increase the photoelectric sensitivity of phototransistors, it is desirable that light be radiated intensively in the vicinity of a PN junction for PN junction phototransistors and to a contact portion for point contact phototransistors.

It has been known conventionally to improve the photoelectric sensitivity of a phototransistor, as illustrated in FIG. 1, by converging light at a junction 3 of a phototransistor 2 with the aid of a convex lens 1. Although it is desirable to use a small size of light convergent lenses for these uses, it has been very hard to produce them due to difficulties involved in the grinding of the lens curvatures. And it has been more difficult to produce small-sized lenses having a short focal distance and a superior degree of light convergency. Moreover, many difficulties have been encountered in attempting to coincide the junction 3 of the phototransistor 2 with a light converging portion of the lens 1 and to secure the lens 1 a plastic frame 4.

On the other hand, there are such elements, for solid luminescent devices, as electroluminescent elements which are made to luminesce by forwardly biasing the PN junction of, for instance, GaAs and causing the recombination of injection carriers; and photoluminescent elements including ZnS and laser diodes which are caused to effect laser action by means of a resonator. In order to extract a flux of rays from these solid luminescent elements in any desired direction, a PN junction 7, for example, of a solid luminescent diode 6 is placed at a focal point of a convex lens 5, as illustrated in FIG. 2, and thus the light due to recombination luminescence emitted from the vicinity of the PN junction 7 is extracted as parallel rays in a desired direction. As far as lenses used for such as application are concerned, the smaller the lenses are in size, and the shorter in focal distance, the smaller is the flux of the parallel rays and the more intense are the rays radiating to a desired direction.

SUMMARY OF THE INVENTION

It is, accordingly, a principal object of the present invention to provide a light detector employing a transparent member as a convergent lens, instead of a conventional convergent convex lens, in order to eliminate the above described deficiencies, said transparent member having such a refractive index distribution in a cross section perpendicular to an direction of the travelling light as to substantially satisfy the equation:

$$n_r = n_0(1 - ar^2)$$

when a refractive index at the center point or center line of the cross section is $n_o$, a refractive index at a distance $r$ from the center point or center line is $n_r$, and a positive constant is $a$.

Another object of the present invention is to provide a solid luminescent device adopting as a convergent lens a transparent member in place of a conventional convergent convex lens, said transparent member having such a simple shape as to be capable of convergent action and having such a refractive index distributions to gradually decrease according to the above equation from inside toward a surface in a cross section vertical to an axis of the travelling light. Stated more concretely, the present invention aims at the provision of a light detector which has extremely effective light convergency to a junction of, for instance, a PN junction phototransistor, and a solid luminescent device by which an extremely intense flux of rays can be obtained in any desired direction.

The above and other objects as well as the characteristic features of the invention will become more apparent and more readily understandable by the following description in connection with the accompanying drawings

DETAILED DESCRIPTION OF THE INVENTION

The fact that a gas having a refractive index distribution as that represented by the above equation is generally capable of functioning as lens is well known as the so-called principle of a gas lens, as is described in pp. 180–187 of No. 3, Vol. 36, of "Oyo Butsuri (Applied Physics)," in which a gas lens is said to have convergent action similar to that of a convex lens. Glass, synthetic resin and the like are suitable as a transparent substance having the refractive index distribution according to the invention. Especially, in the case of glass, it is relatively easy to gradually vary its refractive index from the center of the interior toward a surface, as is described in U.S. Pat. application Ser. No. 806,368, filed Mar. 12, 1969.

Figure 1:
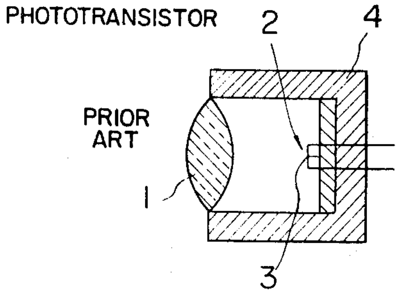
FIG. 1 is a schematic view showing a phototransistor having a art convergent lens.
Figure 2:
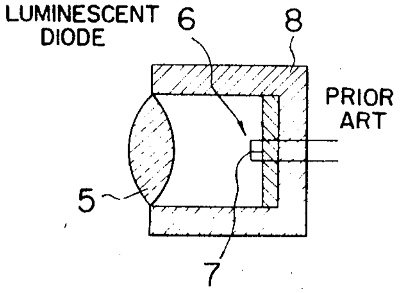
FIG. 2 is a schematic view showing a solid luminescent device having a prior art convergent lens.
Figure 3:
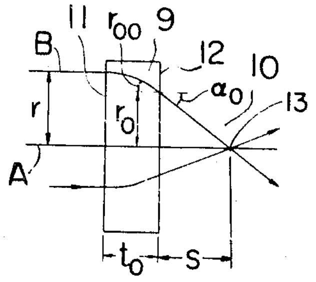
FIG. 3 is a schematic diagram illustrating that rays in parallel with an optical axis of a columnar lens used in the invention are converged at one point.

It can be calculated from the following equation that a flux of rays in parallel with an optical axis of a transparent body having such a refractive index distribution are converged at one point. Referring to FIG. 3, the reference numeral 9 designates a columnar lens having a radius R, a length $t_o$ and a refractive index distribution $n_r = n_o(1 - ar^2)$, where $ar^2 << 1$, $n_r$ represents a refractive index at a radial distance $r$ from a center axis of a columnar lens, and reference numeral 10 represents a transparent medium having a uniform refractive index $n_{oo}$ and in close contact with the columnar lens. Light B in parallel with an optical axis A on a straight line connecting the refractive index $n_o$ of the columnar lens 9, that is, at a point at a distance $r$ from the optical axis A, enters the columnar lens 9 at its plane of incidence 11 and leaves the lens 9 at its place of light emission 12. When the distance of the light B at the plane of light emission 12 from the optical axis A is $r_o$ and the angle of inclination of the light the plane of light emission 12 within the lens 9 is $r_{oo}$, $r_o$ and $r_{oo}$ can be represented by the following matrix:

$$\begin{bmatrix} r_o \\ r_{oo} \end{bmatrix} = \begin{bmatrix} \cos\sqrt{2a}\,t_o, & \frac{1}{\sqrt{2a}}\sin\sqrt{2a}\,t_o \\ -\sqrt{2a}\sin\sqrt{2a}\,t_o, & \cos\sqrt{2a}\,t_o \end{bmatrix} \begin{bmatrix} r \\ o \end{bmatrix} = \begin{vmatrix} r\cos\sqrt{2a}\,t_o \\ -r\sqrt{2a}\sin\sqrt{2a}\,t_o \end{vmatrix} \quad (1)$$

When the inclination of the light within the medium $n_{oo}$ due to the plane of light emission 12 of the lens 9 is $\alpha_o$:

$n_r \sin r_{oo} = n_{oo} \sin \alpha_o$ (where $n_r \doteqdot n_o$) and approximately:

$$\alpha_o = \frac{n_o}{n_{oo}} r_{oo} \quad (2)$$

A distance S of a cross-point 13 of the light passing the optical axis A and the light B from the plane of light emission of the lens 9 is:

$$S=\frac{r_0}{\tan \alpha_0}\fallingdotseq\frac{r_0}{\alpha_0}$$

From the equation (1), the following equation is obtained:

$$S=\left|\frac{-n_{oo}\cot\sqrt{2a}\,t_o}{n_o\sqrt{2a}}\right|$$

$$\left(\text{where } \frac{n\pi}{\sqrt{2a}}<t_o\leq\frac{(2n+1)\pi}{2\sqrt{2a}}\ n=0,\ 1,\ 2\ \ldots\right) \qquad (3)$$

And since the equation (3) is not in any relation with $r$, the rays in parallel with the optical axis A are converged at this point. When $t_o$ is further enlarged, the light passing the optical axis A crosses the light B in the lens 9. That is, when the condition $r_o$=0 is substituted into the equation (1), the following equation is obtained:

$$\sqrt{2a}\cdot t_o=\frac{(2n+1)\pi}{2}$$

(where $n=0,\ 1,\ 2,\ 3\ \ldots$)

$$t_o=\frac{(2n+1)\pi}{2\sqrt{2a}} \qquad (4)$$

(where $n=0,\ 1,\ 2,\ 3\ \ldots$)

Thus, when $t_o$ is selected so as to satisfy the equation(4), the rays in parallel with the optical axis A entering the lens 9 at its surface 11 are converged at the plane of light emission 12 of the lens 9.

The present invention concerns a light detector in which a photosensitive portion a light detection element is disposed at a convergence point of a transparent body having such a refractive index distribution in a cross section perpendicular to an axis of light progress as to nearly satisfy the equation:

$$n_r=n_o\,(1-ar^2),$$

when a refractive index at the center of the cross section if $n_o$, a refractive index at a distance $r$ from the center is $n_r$, and a positive constant is $a$; and the invention further concerns a light detector wherein the length of said transparent body in a direction of the axis of light progress is set nearly at $$(2n+1)\pi/2\sqrt{2a}$$

(where $n$=0, 1, 2, 3 ...) and a photosensitive portion of a light detection element is provided at a convergent portion on a plane of light emission of said transparent body.

According to the present invention, the surfaces of a convergent lens of a light detector need not be ground into a specific curvature, so that small-sized lenses having a superior degree of light convergency are obtainable. Thus, not only are small and high-sensitivity light detectors made available, but also the lenses can be easily fixed to plastic frames due to their simple shape. Furthermore, when the length of the lens in the direction of the axis of light progress is selected at $$(2n+1)\pi/2\sqrt{2a}$$

(where $n$=0, 1, 2, 3), the light detection element can be directly fixed to a convergent portion of a plane of light emission of the lens, with a result that a light detector can be fabricated very easily. Also a junction portion or contact portion of a phototransistor can be formed at the convergent portion of the plane of light emission of the lens, to find application in an integrated circuit. Furthermore, by giving an elongated shape to such a lens to provide flexibility thereto, light at a distance can be led to the light detection element.

The light detector of the invention will now be described according to its several preferred examples.

EXAMPLE 1

Figure 4:
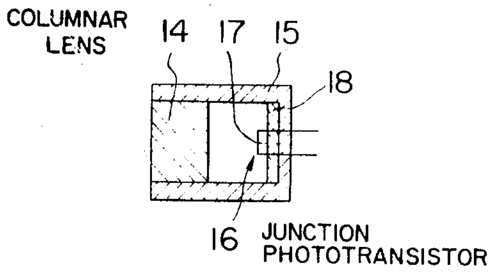
FIG. 4 is a schematic view showing a light detector embodying the invention.

A bar of glass having a circular cross section with a diameter of 1 mm. and composed of 56 weight percent of $SiO_2$, 14 weight percent of $Na_2$20 weight percent of $Tl_2O$ and 10 weight percent of PbO was steeped for a specific length of time in a bath of potassium nitrate held at a high temperature to obtain a glass bar with a refractive index at a center of 1.56, a surface refractive index of 1.48, and an internal refractive index distribution satisfying the equation $n_r=n_o\,(1-ar^2)$, where $a$=0.21 mm.$^{-2}$. Then, a columnar lens 14 obtained by cutting the glass bar thus treated into a length of $t_o$=1 mm. and grinding both end faces thereof at a right angle to its optical axis, as illustrated in FIG. 4, was fixed to a plastic frame 15. A junction portion 17 of a junction phototransistor 16 or a contact portion 17 of a point contact phototransistor was then fixed to the plastic frame 15 through a support plate 18 on an optical axis at a distance S=2.84 mm. from the plane of light emission of the columnar lens 14. A phototransistor having this columnar lens 14 is not only small in size, but has very superior photoelectric sensitivity.

EXAMPLE 2

The length in a direction of the optical axis of a columnar lens obtained in the same way as in example 1 was set at $t_o$= 2.42 mm., and a PN junction portion of a junction phototransistor or a contact portion of a point contact phototransistor was directly formed at a convergent point on a plane of light emission of said columnar lens.

A phototransistor integrated with such a lens can be easily fixed to a plastic frame and is small in size and superior in photoelectric sensitivity.

An analysis as to a transparent body having the above described refractive index distribution is described in pp. 2017–2023 of the Nov. 1965, issue of "The Bell System Technical Journal," where it is clarified that when faces of such a transparent body at a right angle to an axis of light progress are respectively made planes of light incidence and emission, a distance between the planes, e.g., the thickness of the transparent body is $t_o$, and a distance from the plane of light emission of a point where parallel rays of light vertically entering the plane of light incidence are converged on the optical axis is S, the following equation is obtained:

$$S=\left|\frac{n_{oo}\cot\sqrt{2a}\,t_o}{n_o\sqrt{2a}}\right|$$

$$\left(\text{where } \frac{n\pi}{\sqrt{2a}}<t_o\leq\frac{(2n+1)\pi}{2\sqrt{2a}}\ (n=0,\ 1,\ 2,\ 3,\ 4\ \ldots\right)$$

And $n_{oo}$ is represented by a refractive index of a transparent medium residing in the side of the plane of light emission of the transparent body. Said parallel rays of light converge on a plane of light emission of this transparent body when $t_o=(2n+1)\pi/2\sqrt{2a}$.

According to the invention, a luminescent region of a solid luminescent element is formed at a convergent portion of the above transparent body, said solid luminescent element is made to luminesce by being impressed with a DC voltage in a forward direction, and the luminescent light is extracted as rays of light in parallel with the optical axis of said transparent body. In other words, the invention concerns a solid luminescent element wherein a luminescent region of a solid luminescent element is formed at a convergent portion of a transparent body having such a refractive index distribution in a cross section perpendicular to an axis of light advance as to substantially satisfy the equation:

$$n_4=n_o\,(1-ar^2),$$

when a refractive index at the center of the cross section is $n_o$, a refractive index at a distance $r$ from the center is $n_r$, and a positive constant is $a$; and the invention further concerns a solid luminescent element wherein the length of said transparent body in a direction of the axis of light progress is set nearly at: $(2n+1)\pi/2\sqrt{2a})$ (where $n$=0, 1, 2, 3, 4, ... )

and a luminescent region of a solid luminescent element is formed at a convergent portion on a plane of said transparent According to the present invention, the surfaces of the lens of a solid luminescent element need not be ground into a definite curvature, so that transparent substance lenses are obtained which are both superior in light convergency and small in size. And easy fixture to a plastic frame is insured due to the simple shape of the lens. Further, when the length of the transparent body is selected approximately at c$2n+1)\pi/2\sqrt{2a})$ in a direction of the axis of light progress, a luminescent region of a solid luminescent element can be fixed directly to a convergent portion of the transparent body. Thus the lens and luminescent element are integrated, permitting simplified fabrication and incorporation into an integrated circuit.

A solid luminescent element thus reduced in size can be applied in a dial of an electric meter and the like, in a lamp of an electroluminescent display board, and in a TV picture element for forming pictures with electric pulses. Furthermore, by elongating the shape of the lens, the light of the solid luminescent element can be led to any desired position.

The invention will now be described according to several example of a solid luminescent device.

EXAMPLE 3

Figure 5:
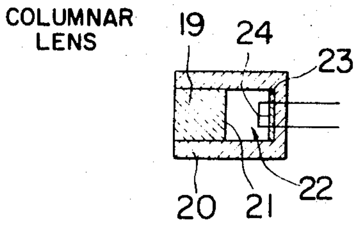
FIG. 5 is a schematic view showing a solid luminescent device embodying the invention.

A bar of glass having a circular cross section with a diameter of 1 mm. and composed of 56 weight percent of $SiO_2$, 14 weight percent of $Na_2O$, 20 weight percent of $Tl._2O$ and 10 weight percent of PbO was steeped for a specific length of time in a bath of potassium nitrate held at a high temperature, to obtain a glass bar with a refractive index $n_o$ at a center of 1.56, a surface refractive index of 1.48, and an internal refractive index distribution substantially satisfying the equation $n_r = n_o(1-ar^2)$, where $a=0.21$ mm.$^{-2}$. This glass bar was cut into a length of $t_o=1$ mm. and end faces thereof were ground so as to be at a right angle to the optical axis of the bar. As illustrated in FIG. 5 the columnar lens 19 thus obtained was fixed to a plastic frame 20, a solid luminescent element 22 was fixed to a plastic frame 20 through a support plate 23 at a position at a distance of S=2.84 mm. from a face 21 of the columnar lens 19 in such a manner that a PN junction 24 is in agreement with the optical axis. The solid luminescent element equipped with this columnar lens 19 was small in size and afforded an intense flux of rays.

EXAMPLE

The length $t_o$ in an optical axis direction of the same columnar lens as that in example 3 was set at 2.42 mm., and a PN junction of a solid luminescent element was formed directly at a convergent point on a plane of said columnar lens. The solid luminescent element integrated with such a lens was easily fixed to a plastic frame and built into an integrated circuit.

It is apparent that a transparent body used in a photoelectric converter according to this invention is not limited to the above-mentioned columnar lens. In an equation expressing a refractive index distribution of a transparent body $n_o$ includes not only a refractive index at a center point of the cross section, but also that at a central line. In case of making parallel light enter a transparent body in the above case, the parallel light converges not to a point but to a line. Accordingly, the transparent body in this case performs the same function as an ordinary cylindrical lens.

An analysis concerning this transparent body can be obtained in such a same manner as that concerning a columnar lens, regulating in that the equations from (1) to (4) can be applied in this example. The transparent body, in this example, of which a convergent portion portion is in the shape of line, is especially useful in a case where a photosensitive portion of a light detecting element or a luminescent region of a solid luminescent element, for example a PN junction portion of a PN junction type of phototransisto or a photosensitive diode, is in the shape of line.

We claim:

1. A photoelectric converter comprising a photoelectric conversion element, a transparent member having a refractive index distribution in a cross section perpendicular to a direction of light progress which substantially satisfies the equation:

$$n_r = n_o(1-ar^2),$$

where $n_o$ is a refractive index at the center of the cross section, $n_r$ is a refractive index at a distance $r$ from the center, and $a$ is a positive constant, and means for positioning said conversion element with respect to said transparent member at a light convergence point of said transparent member.

2. A photoelectric converter comprising a photosensitive light detection element, a transparent member having a refractive index distribution in a cross section perpendicular to an axis of light progress which substantially satisfies the equation:

$$n_r = n_o(1-ar^2),$$

where $n_o$ is a refractive index at the center of the cross section, $n_r$ is a refractive index at a distance $r$ from the center and $a$ is a positive constant, and means for positioning a photosensitive portion of said light detection element at a light convergence point of said transparent member.

3. A photoelectric converter comprising a light detection element, a transparent member having a length in a direction of light progress of approximately $(2n+1)\pi/2\sqrt{2a})$ (where $n=0, 1, 2, 3, 4 \ldots$ ), and having a refractive index distribution in a cross section perpendicular to an axis of light progress which substantially satisfies the equation:

$n_r = n_o(1-ar^2)$, where $n_o$ is a refractive index at the center of the cross section $n_r$ is a refractive index at a distance $r$ from the center, and $a$ is a positive constant, wherein said transparent member has a light convergence point on a surface thereof, and means positioning a photosensitive portion of said light detection element at said light convergence point on said transparent member.

4. A photoelectric converter comprising a solid luminescent element a transparent member having a refractive index distribution in a cross section perpendicular to an axis of light progress which substantially satisfies the equation:

$$n_r = n_o(1-ar^2),$$

where $n_o$ is a refractive index at the center of the cross section, $n_r$ is a refractive index at a distance $r$ from the center, and $a$ is a positive constant, and means for positioning a luminescent region of said element at a light convergence point of said transparent member.

5. A photoelectric converter comprising a solid luminescent element, a transparent member having a length in a direction of light progress of approximately $(2n+1)\pi/2\sqrt{2a})$ (where $n=0, 1, 2, 3, 4 \ldots$ ), and having a refractive index distribution in a cross section perpendicular to an axis of light progress which substantially satisfies the equation:

$n_r = n_o(1)-ar^2)$, where $n_o$ is a refractive index at the center of the cross section, $n_r$ is a refractive index at a distance $r$ from the center, and $a$ is a positive constant, wherein said transparent member has a light convergence point on a surface thereof, and means positioning a luminescent portion of said element at said light convergence point on said transparent member.

6. A photoelectric converter comprising a semiconductor photoelectric conversion element, a transparent glass member having two planar end surfaces and a center longitudinal axis, said end surfaces being perpendicular to said center axis passing therethrough, and said glass member having a refractive index distribution in a cross section perpendicular to said center axis and parallel to said end surfaces which substantially satisfies the equation:

$n_r = n_o(1-ar^2)$, where $n_o$ is a refractive index at the center of the cross section, $n_r$ is a refractive index at a radium distance $r$ from the center axis, and $a$ is a positive constant, said glass member having a length/corresponding to the distance between said end surfaces which satisfies the expression $$(n\pi/\sqrt{2a} < t_o \quad (2n+1)\pi,/2\sqrt{2a})$$

where $n$ represents zero or a positive integer, and said conversion element having a conversion surface portion disposed at a point along a line extending from one end surface of said glass member and defining an extension of said center axis, wherein the distance between said one end surface and said surface portion is substantially equal to $$(n_{oo} \cot \sqrt{2a}\, t_o / n_o \sqrt{2a})$$

where $n_{oo}$ is a refractive index of the transparent medium between said one end surface and said surface portion, whereby said surface portion is positioned at a focal point of said glass member.

7. A photoelectric converter as claimed in claim 6, in which said semiconductor photoelectric conversion element is a phototransistor and said conversion surface portion is a photosensitive portion of said phototransistor.

8. A photoelectric converter as claimed in claim 6, in which said semiconductor photoelectric conversion element is a phototransistor and said conversion surface portion is a photosensitive portion of said phototransistor, and in which said length of said glass member is substantially equal to $(2n+1)\pi/a0\sqrt{2a})$, whereby the distance between said one end surface of said glass member and said photosensitive portion is substantially zero.

9. A photoelectric converter as claimed in claim 6, in which said semiconductor photoelectric conversion element is a semiconductor solid luminescent element and said conversion surface portion is the luminescent portion of said luminescent element.

10. A photoelectric converter as claimed in claim 6, in which said semiconductor photoelectric conversion element is a semiconductor solid luminescent element and said conversion surface portion is the luminescent portion of said luminescent element, and in which said length of said glass member is substantially equal to $((2n+1)\pi/2\sqrt{2a})$, whereby the distance between said one end surface of said glass member and said luminescent portion is substantially zero.

* * * * *